US010679401B2

United States Patent
Otta et al.

(10) Patent No.: US 10,679,401 B2
(45) Date of Patent: Jun. 9, 2020

(54) MONITORING MULTIPLE INDUSTRIAL MACHINES

(71) Applicant: GE Inspection Technologies, LP, Lewistown, PA (US)

(72) Inventors: Shourya Otta, Niskayuna, NY (US); Shyam Sivaramakrishnan, Niskayuna, NY (US); Arun Karthi Subramaniyan, Niskayuna, NY (US); Michael Szatny, Niskayuna, NY (US)

(73) Assignee: GE Sensing & Inspection Technologies, LP, Lewistown, PA (US)

( * ) Notice: Subject to any disclaimer, the term of this patent is extended or adjusted under 35 U.S.C. 154(b) by 0 days.

(21) Appl. No.: 16/169,061

(22) Filed: Oct. 24, 2018

(65) Prior Publication Data

US 2019/0122416 A1 Apr. 25, 2019

Related U.S. Application Data

(60) Provisional application No. 62/682,566, filed on Jun. 8, 2018, provisional application No. 62/576,630, filed on Oct. 24, 2017.

(51) Int. Cl.
*G06F 3/0481* (2013.01)
*G06T 15/00* (2011.01)
(Continued)

(52) U.S. Cl.
CPC .......... *G06T 15/005* (2013.01); *G06F 3/0481* (2013.01); *G06T 15/04* (2013.01);
(Continued)

(58) Field of Classification Search
CPC ..... G06T 15/005; G06F 3/048; G06F 3/0481; G05B 23/0221; G05B 23/0224; G05B 23/0272
See application file for complete search history.

(56) References Cited

U.S. PATENT DOCUMENTS 8,793,112 B2 * 7/2014 Levitan .................. E21B 49/00 703/10
9,292,012 B2 * 3/2016 Sayyarrodsari ........ G05B 17/02
(Continued)

*Primary Examiner* — Antonio A Caschera
(74) *Attorney, Agent, or Firm* — Mintz Levin Cohn Ferris Glovsky and Popep, P.C.

(57) ABSTRACT

A monitoring system can include a dashboard including a graphical user interface display space. The monitoring system can also include a digital twin validation system including a processor configured to perform operations including rendering, in a graphical user interface display space, an interactive graphical object characterizing a first input value of a first digital model of a plurality of oil and gas industrial machines. The operations can also include receiving data characterizing user interaction with the interactive graphical object. The data characterizing the user interaction can be indicative of the first input value of the first digital model. The operations can further include updating the first digital model to generate updated output values representative of an operational parameter of the plurality of oil and gas industrial machines. The operations can also include rendering, in the graphical user interface display space, a visual representation of the updated output values.

18 Claims, 14 Drawing Sheets

(51) Int. Cl.

*G06T 15/20* (2011.01)
*G06T 15/04* (2011.01)
*G06T 19/20* (2011.01)

(52) U.S. Cl.

CPC .............. *G06T 15/20* (2013.01); *G06T 19/20* (2013.01); *G06T 2219/2016* (2013.01)

(56) References Cited

U.S. PATENT DOCUMENTS

| | | | | |
|---|---|---|---|---|
| 10,055,114 | B2 * | 8/2018 | Shah | G06F 3/04847 |
| 2014/0006992 | A1 * | 1/2014 | Broussard, III | G06F 3/04847 715/771 |
| 2016/0333855 | A1 * | 11/2016 | Lund | F03D 7/048 |

* cited by examiner

MONITORING MULTIPLE INDUSTRIAL MACHINES

RELATED APPLICATION

This application claims priority under 35 U.S.C. § 119(e) to U.S. Provisional Patent Application No. 62/576,630 filed on Oct. 24, 2017, and U.S. Provisional Patent Application No. 62/682,566, filed on Jun. 8, 2018. The entire contents of each are hereby expressly incorporated by reference herein.

BACKGROUND

Artificial lift mechanisms such as Electrical Submersible Pumps (ESPs), Rod Lift Systems, etc., can be used to extract oil from conventional and unconventional sources. Production of oil from ESP wells can be optimized for each well individually. Production engineers rely on judgment and experience to go through an iterative process to optimize wells individually while ensuring that cluster level constraints are not violated. This process can be cumbersome and may not result in the maximum production of oil across the wells in the cluster.

In addition, software applications currently used by oil and gas personnel may be desktop-based. Very few applications work on mobile devices of different form. Because computing resources available on desktops can be limited, certain optimization algorithms can take longer than a user may be willing or able to wait. In some cases, the algorithms can be scheduled to run in the background. Users can be notified when optimization potential crosses a pre-defined threshold. Due to limited availability of computing resources on desktop environments, software packages can be unable to provide a desirable user experience. Additionally, well models may be calibrated on an ad-hoc basis, resulting in the optimization being performed with uncalibrated well models.

SUMMARY

Various aspects of the disclosed subject matter may provide one or more of the following capabilities. The oil field monitoring system can improve/alter the production of oil, water, and/or gas of an oil well cluster in an oil field by controlling the operating parameters of an oil pumps in the oil well cluster. The monitoring system can provide the user with recommendations (e.g., for values of over oil production or power consumption by the oil well cluster). The monitoring system can also simulate crude oil production based on inputs provided by the user.

In one implementation, a method can include rendering, in a graphical user interface display space, an interactive graphical object characterizing a first input value of a first digital model of a plurality of oil and gas industrial machines. The method can also include receiving data characterizing user interaction with the interactive graphical object. The data characterizing the user interaction can be indicative of the first input value of the first digital model. The method can further include updating the first digital model to generate updated output values representative of an operational parameter of the plurality of oil and gas industrial machines. The method can also include rendering, in the graphical user interface display space, a visual representation of the updated output values.

One or more of the following features can be included in any feasible combination.

In one implementation, updating the first digital model of the plurality of oil and gas industrial machines can include determining one or more system coefficients associated with the plurality of oil and gas industrial machines. In another implementation, the first digital model can be configured to calculate the one or more system coefficients based on a characteristic mathematical representation of the plurality of oil and gas industrial machines. The characteristic mathematical representation can include a system of equations that calculate the one or more system coefficients based, at least in part, on the data characterizing the user interaction indicative of the first input value. In yet another implementation, updating the first digital model can include updating at least one variable in the system of equations based on the first input value and evaluating the updated first model to generate the updated output values.

In one implementation, the method can include determining an uncalibrated oil and gas industrial machine of the plurality of oil and gas industrial machines based on comparison between detected operating parameters of the uncalibrated oil and gas industrial machine and operating parameters of the oil and gas industrial machines calculated by the first model. The method can also include rendering, in the graphical user interface display space, a third interactive graphical object indicative of the uncalibrated oil and gas industrial machine.

In one implementation, the method can include receiving user input characterizing selection of a second oil and gas industrial machine of the plurality of oil and gas industrial machines. The method can also include rendering, in the graphical user interface display space, a visual representation of the calculated values of the second operational characteristic of the second oil and gas industrial machine.

In one implementation, the method can include rendering, in the graphical user interface display space, a second interactive graphical object characterizing a second input value indicative of selection of one or more oil and gas industrial machines from the plurality of oil and gas industrial machines. The method can also include receiving data characterizing user interaction with the second interactive graphical object indicative of the second input value. The method can further include generating the first digital model based on the second input value.

In one implementation, the method can include receiving detected input values representative of the operational parameter of the plurality of oil and gas industrial machines. The method can also include rendering, in the graphical display space, a visual representation of the input values adjacent to the visual representation of the updated output values. The detected input values of the operational parameter can be detected by one or more sensors coupled to the plurality of oil and gas industrial machines. In another implementation, the plurality of oil and gas industrial machine can include one or more of a crude distillation unit, control valves, a reservoir, a casing unit, pumps and tubing unit.

In one implementation, the method can include communicating data characterizing one or more of the first digital model. The first input value and the updated output values to a global monitoring system can be configured to monitor the plurality of oil and gas industrial machines. In another implementation, the method can include transmitting, to a controller of an oil and gas industrial machine of the plurality of oil and gas industrial machines, an instruction to modify operation of the oil and gas industrial machine. In yet another implementation, the plurality of oil and gas industrial machines are in communication with a machine monitoring platform including the first digital model.

In one implementation, a system can include at least one data processor, and memory coupled to the at least one data processor. The memory storing instructions can cause the at least one data processor to perform operations including rendering, in a graphical user interface display space, an interactive graphical object characterizing a first input value of a first digital model of a plurality of oil and gas industrial machines. The operations can also include receiving data characterizing user interaction with the interactive graphical object. The data characterizing the user interaction can be indicative of the first input value of the first digital model. The operations can further include updating the first digital model to generate updated output values representative of an operational parameter of the plurality of oil and gas industrial machines. The operations can also include rendering, in the graphical user interface display space, a visual representation of the updated output values.

One or more of the following features can be included in any feasible combination.

In one implementation, updating the first digital model of the plurality of oil and gas industrial machines can include determining one or more system coefficients associated with the plurality of oil and gas industrial machines. In another implementation, the first digital model can be configured to calculate the one or more system coefficients based on a characteristic mathematical representation of the plurality of oil and gas industrial machines. The characteristic mathematical representation can include a system of equations that calculate the one or more system coefficients based, at least in part, on the data characterizing the user interaction indicative of the first input value. In yet another implementation, updating the first digital model can include updating at least one variable in the system of equations based on the first input value and evaluating the updated first model to generate the updated output values. In another implementation, the plurality of oil and gas industrial machine can include one or more of a crude distillation unit, control valves, a reservoir, a casing unit, pumps and tubing unit.

In one implementation, a monitoring system can include a dashboard including a graphical user interface display space. The monitoring system can also include a digital twin validation system including a processor configured to perform operations including rendering, in a graphical user interface display space, an interactive graphical object characterizing a first input value of a first digital model of a plurality of oil and gas industrial machines. The operations can also include receiving data characterizing user interaction with the interactive graphical object. The data characterizing the user interaction can be indicative of the first input value of the first digital model. The operations can further include updating the first digital model to generate updated output values representative of an operational parameter of the plurality of oil and gas industrial machines. The operations can also include rendering, in the graphical user interface display space, a visual representation of the updated output values.

These and other capabilities of the disclosed subject matter will be more fully understood after a review of the following figures, detailed description, and claims.

BRIEF DESCRIPTION OF THE FIGURES

These and other features will be more readily understood from the following detailed description taken in conjunction with the accompanying drawings, in which.

DETAILED DESCRIPTION

Production of crude oil (or natural gas and/or water) from an oil well cluster can be improved by changing the operation of oil pumps in the oil wells of the cluster. Changing the operation of the pumps can include changing, for example, speed/frequency of rotation of motors in the oil pumps, pressure at the well head (controlled by the valve at the well head), and the like. But trying to improve the oil production of the cluster by manually varying the operation of one or more oil pumps can be cumbersome. For example, it can be challenging to improve/vary the oil production of the cluster if there are cluster constraints (e.g., energy consumed by the oil pumps in the cluster, total oil generated by the cluster, and the like). To guide the user in improving oil production for the entire cluster as opposed to a single oil well, an intuitive interface can allow a user to calibrate and simulate changes in how the oil wells in the cluster would operate if the operator changed cluster constraints and/or operating parameters of the oil pumps in the cluster. These constraints can include, for example, water production, power consumption, and the like. The interface can automatically provide recommendations for how to modify each oil well in the cluster to optimize output while achieving the desired cluster constraints. Additionally, the user can remotely alter oil well operation, such as altering the operation of the pump. This remote modification of the oil well can be based on the hypothetical change in operation used in the simulation. Other embodiments are within the scope of the present disclosure.

Figure 1:
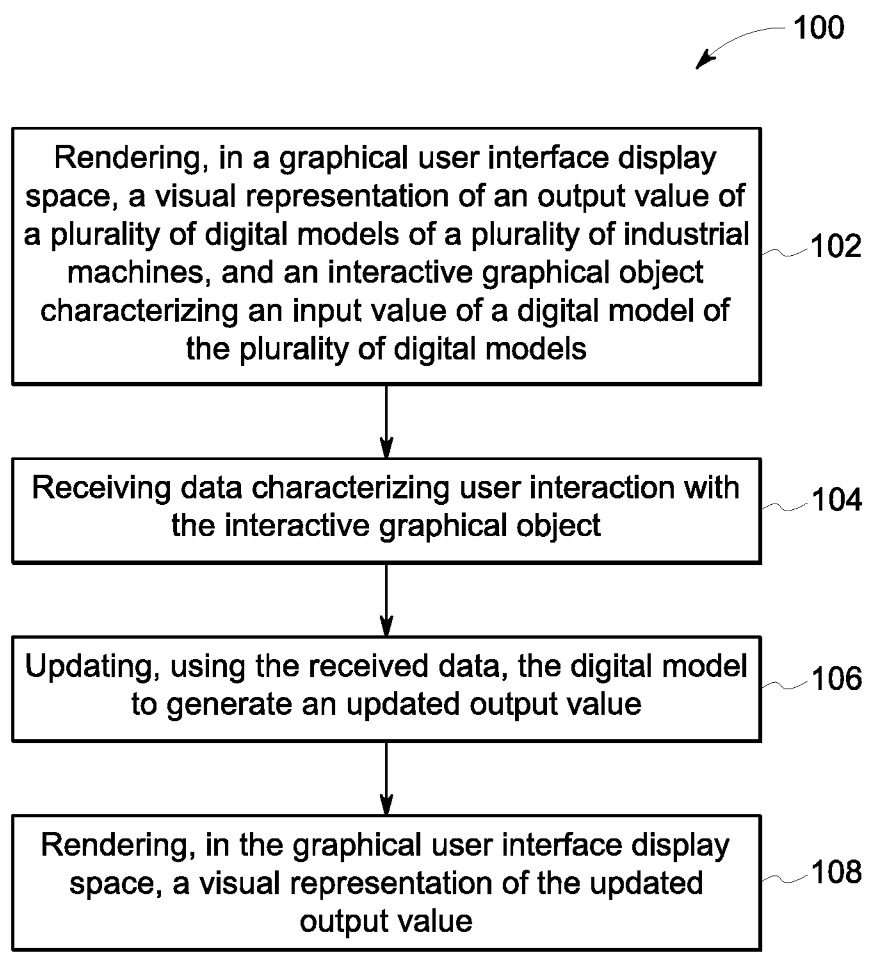
FIG. 1 is a flow chart of an exemplary method for monitoring and managing the operation of an oil well cluster.

FIG. 1 is a flow chart 100 of an exemplary method for monitoring and managing the operation of an oil and gas industrial machine (e.g., oil pumps) associated with an oil well cluster ("cluster"). An oil well cluster can include multiple oil wells (e.g., oil wells that are in geographical proximity, share a common feature, etc.). Oil well clusters (e.g., ESPs in the oil well cluster) can share infrastructure for power and total flow handling capability that impose cluster-level constraints that can be factored into the optimization process.

At 102, a visual representation of an output value of a plurality of digital models of a plurality of industrial machines (e.g., oil pumps) can be rendered in a graphical user interface display space. The output value can include, for example, oil, water, and/or gas generated by the various wells in the cluster. The output can also include an expected change in the generation of oil, water, and/or gas based on changes to cluster constraints (e.g., total oil, water, and/or gas generated by the cluster, power consumed by oil pumps in the cluster, and the like).

Figure 2:
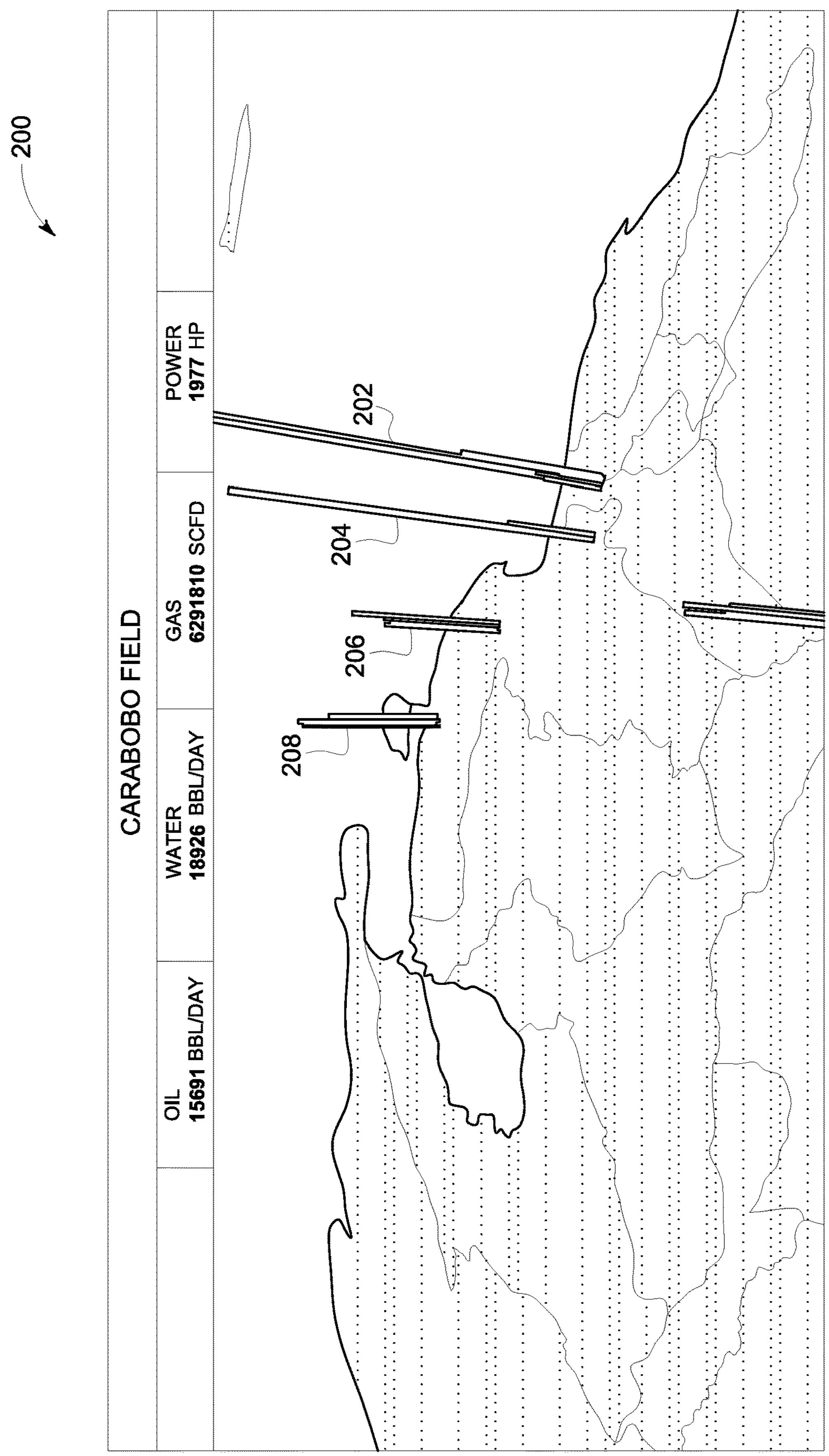
FIG. 2 is an illustration of an oil field map of an exemplary graphical user interface (GUI) display.

FIG. 2 is an illustration of an oil field map of an exemplary graphical user interface (GUI) display 200. The GUI display 200 is associated with a monitoring system of an oil field (e.g., Carabobo field), and can present a visual representation of oil field information (e.g., oil, water, and/or gas production) associated with the oil wells in the oil field. The oil field information can be based on detection by sensors at the oil wells (e.g., well head pressure, operating parameters of the oil pump, and the like) and/or other locations.

The monitoring system can include a Digital Twin Validation (DTV) system that can include optimization algorithm that can, for example, calibrate digital models for various wells and/or a digital model for multiple wells in the cluster (or all the wells in the cluster). Calibration of digital models can be based on, for example, characteristic of the oil wells detected by sensors that can determine oil well properties. In one implementation, calibration of a digital model of an oil well can involve recalculation of system parameters used in the digital model and indicative of the behavior of the oil well.

The DTV system can use the calibrated digital models to determine the range of desirable operating parameters (e.g., feasible operating region) for the operation of one or more wells, and/or for the operation of the entire oil cluster. Determination of the desirable operating parameters can be based on constraints related to a single well (e.g., permissible range of values for oil well operational parameters such as surface flowrate, bottomhole pressure, pump frequency, well head pressure, intake pressure, and the like) and/or multiple wells in the oil cluster (e.g., total production of oil, water, and/or gas by multiple oil wells, power consumed by multiple oil wells, and the like.

Figure 3:
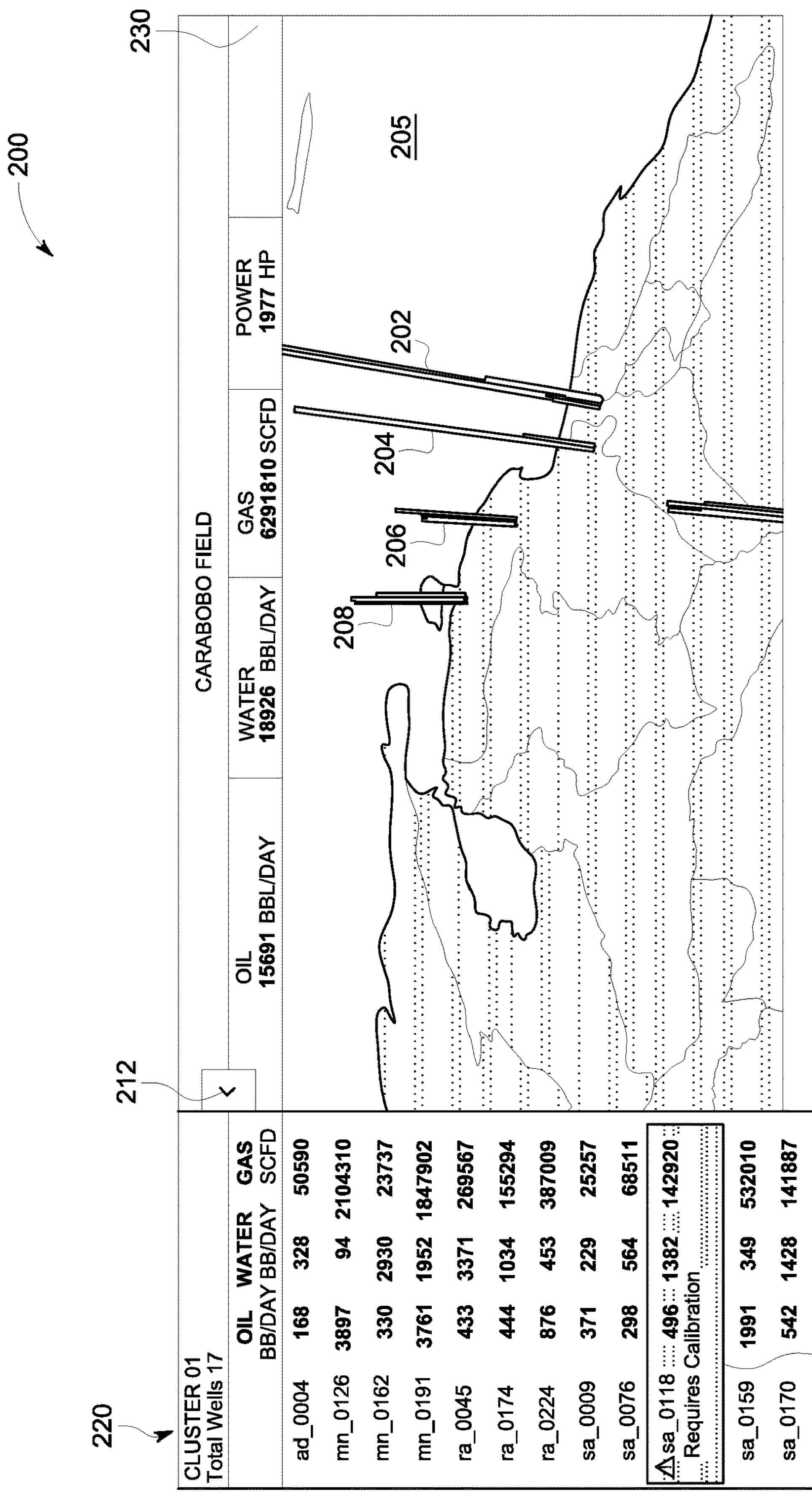
FIG. 3 is an illustration of the GUI display of FIG. 2.

The visual representation can include oil field information (e.g., a plot of pump characteristics calculated by the DTV system with respect to an operational parameter). Oil field information can be visually represented in an oil field map that can display the geographical locations of the oil well clusters 202, 204, 206 and 208. Each cluster can include multiple oil wells. Oil production by each well in a cluster (e.g., oil well cluster 202) can be represented by the length of a graphical bar overlaying the oil field map (e.g., located at the geographical position of the oil well on the oil field map), and/or other visual indicators. FIG. 3 is an illustration of the GUI display 200 that includes a vertical taskbar 220 and an oil field map 205. The vertical taskbar 220 includes information related to various oil wells of a cluster (e.g., "Cluster 01" that includes 17 oil wells). The vertical taskbar can include the names of the wells in the cluster, and information related to the amount of oil, water and gas produced by the oil wells. This information can be based on detection by sensors at the oil wells.

The vertical taskbar can also indicate if an oil well 210 (e.g., well labelled "sa_0118") needs to be calibrated. For example, a visually distinct warning sign (e.g., "Requires Calibration" in red color) can be displayed in the vicinity of the name of the oil well in the vertical taskbar. For example, when the calculated well head pressure deviates significantly from the measured well head pressure, the digital twin needs to be calibrated. The vertical taskbar 220 can be minimized, for example, by clicking on the icon 212 on the vertical taskbar. The GUI display 200 can also include a horizontal bar 230 that can display information about the oil cluster (e.g., oil cluster associated with the oil wells in the vertical taskbar 220). For example, the horizontal taskbar can include information related to oil, water, and/or gas produced by the cluster (e.g., "Cluster 01"), the power consumed by the oil pumps in the cluster, and the like.

Figure 4:
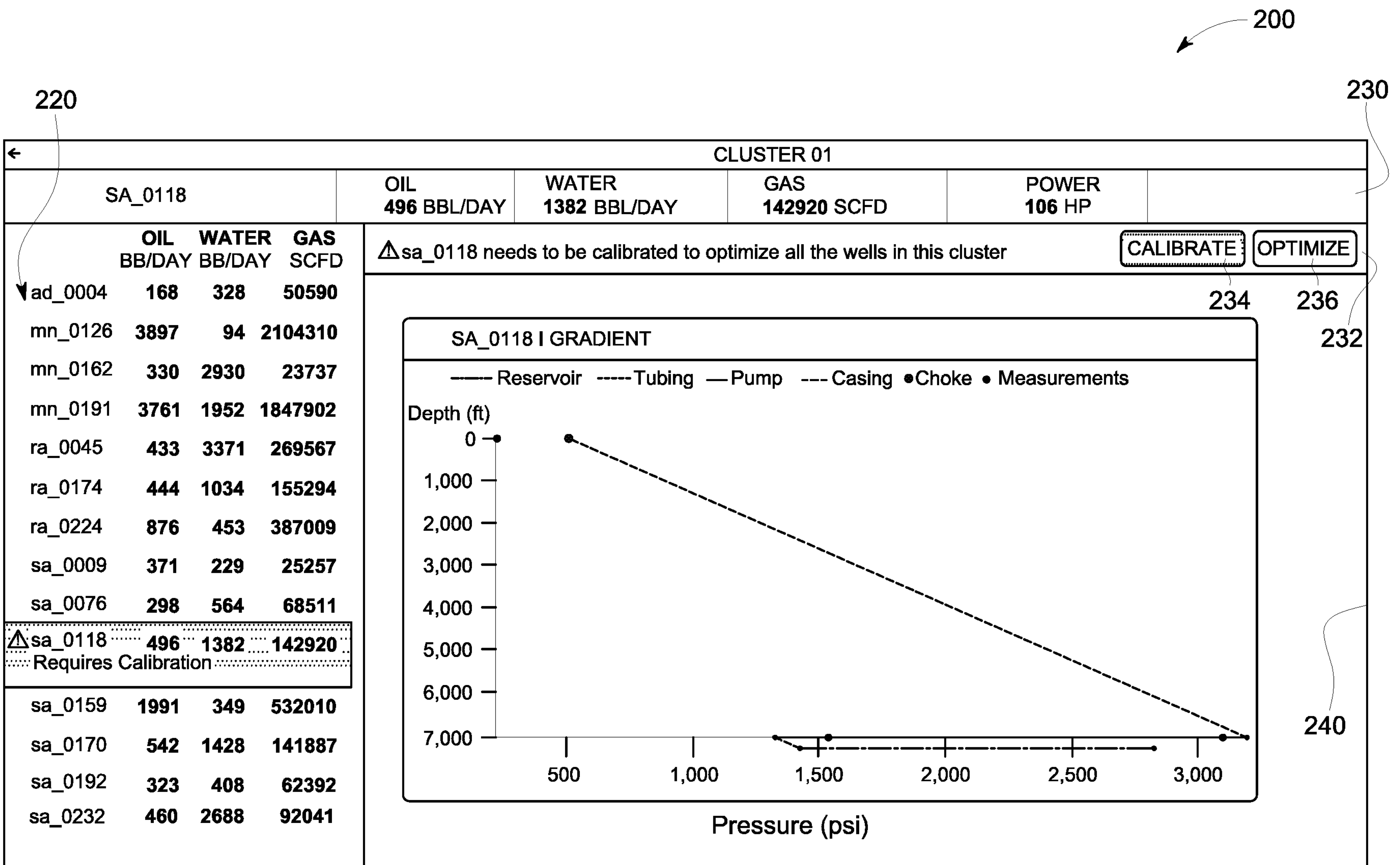
FIG. 4 is an illustration of the GUI display of FIG. 2 that displays user interactive graphical objects for calibrating and optimizing an oil well of an oil well cluster.

At 102, an interactive graphical object characterizing an input value of a digital model of the plurality of digital models can also be rendered in the GUI display space. FIG. 4 is an illustration of the exemplary GUI display 200 that can display user interactive graphical objects (e.g., calibrate icon 234, optimize icon 236, and the like) in an input taskbar 232. The GUI display 200 can also include an information panel 240. A user can select the oil well whose information can be displayed in the information panel 240 (e.g., by clicking on the name of the oil well in the vertical taskbar 220). For example, the information panel 240 can include ESP frequency, depth, power consumption, water cut, Gas-Oil-Ratio (GOR), intake and exit pressures, etc., of the well SA_0118.

Returning back to FIG. 1, at 104, data characterizing user interaction with the interactive graphical object can be received. For example, a user interaction with the interactive graphical object can include clicking on icon calibrate 234 or icon optimize 236 by the user. By clicking on the icon calibrate 234, the user can calibrate oil well information (e.g., oil well information displayed in the information panel 240). In some implementations, the monitoring system can determine that an oil pump requires calibration. For example, the monitoring system can compare the operating parameters of the pump (e.g., obtained from sensors associated with the pump) and operating parameters calculated by the monitoring system using a digital model of the pump. If the difference between the detected operating parameters and the calculated operating parameter is greater than a threshold value, a user can be alerted that the pump is not calibrated ("uncalibrated"). This can be done, for example, by visually distinguishing an icon associated with the uncalibrated pump in the vertical taskbar 220.

Figure 5:
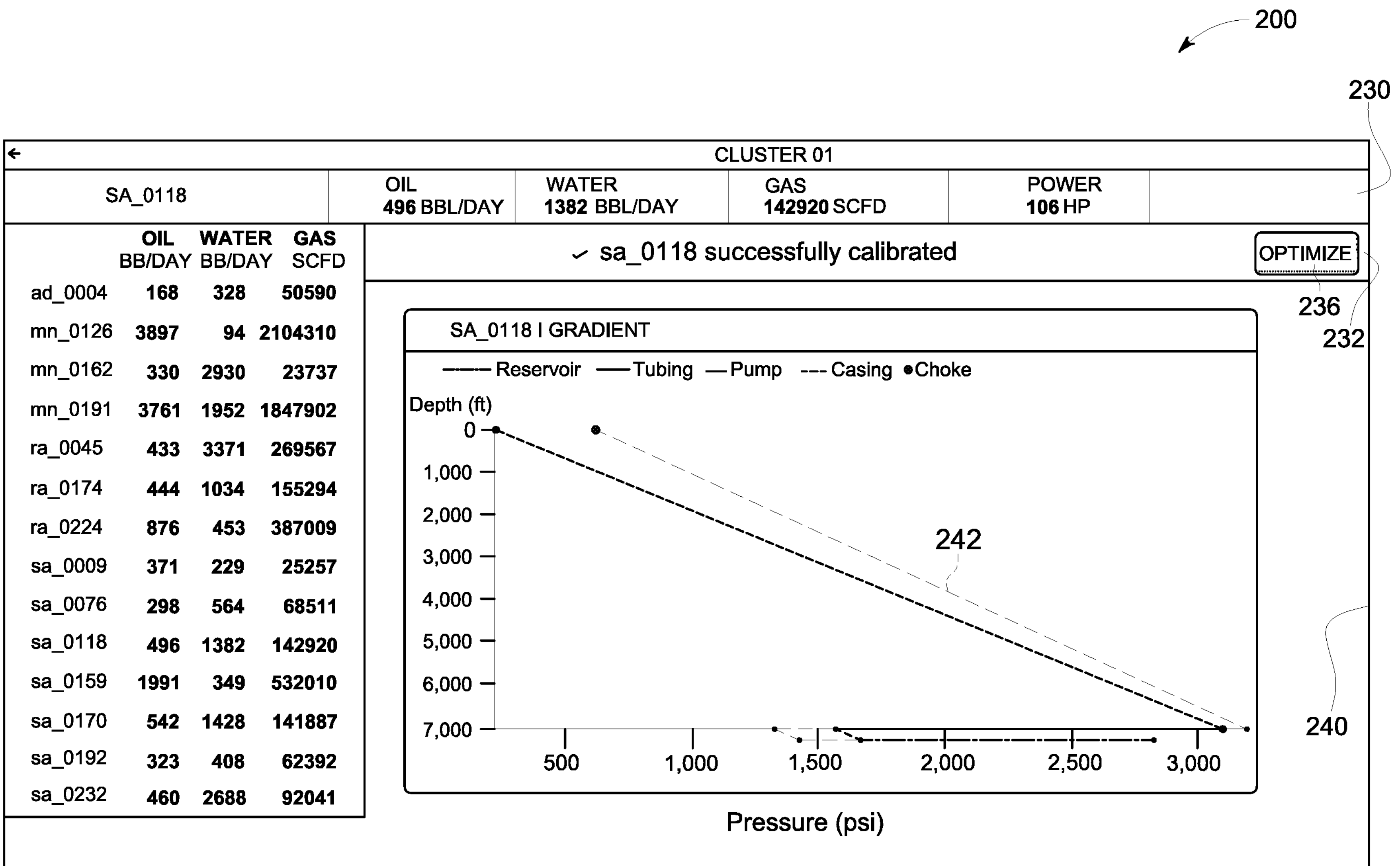
FIG. 5 is an illustration of the GUI display of FIG. 2 that displays calibrated information of an oil well.

At 106, the received data (e.g., related to clicking of the icon calibrate 234) can be used to update the digital model (e.g., digital model executed by the DTV system). For example, the DTV system can execute a calibration model (e.g., which can be a part of the digital model executed by the DTV system) for an oil well (e.g., oil well SA_0118) that can result in a new set of oil well system constants for the oil well (e.g., system parameters of a digital model associated with the oil well). The newly generated set of system constants can be used for determining characteristics (e.g., variable speed pump curve, gradient curve and input performance relation (IPR) curve based on one or more of surface flowrate, bottomhole pressure, pump frequency, well head pressure, intake pressure, and the like) of the oil well (e.g., oil well SA_0118). In some implementations, the digital model can include one or more system coefficients (e.g., predetermined coefficients related to the asset and/or sensors associated with the asset). Updating the digital model can include determining new system coefficients and replacing the coefficients of the digital model with the newly determined coefficients. In some implementations, the new system coefficients can be determined based on data characterizing a property of the asset over a time period (e.g., asset wall thickness data over a period of time) and/or data characterizing user interaction with an interactive graphical object (e.g., interactive graphical objects 234, 236, 238, and the like). At 108, a visual representation of the updated output value (e.g., new set of oil well system constants, oil well characteristics) can be rendered in the GUI display space. For example, in FIG. 5, a calibrated curve 242 is displayed in the information panel 240.

Figure 6:
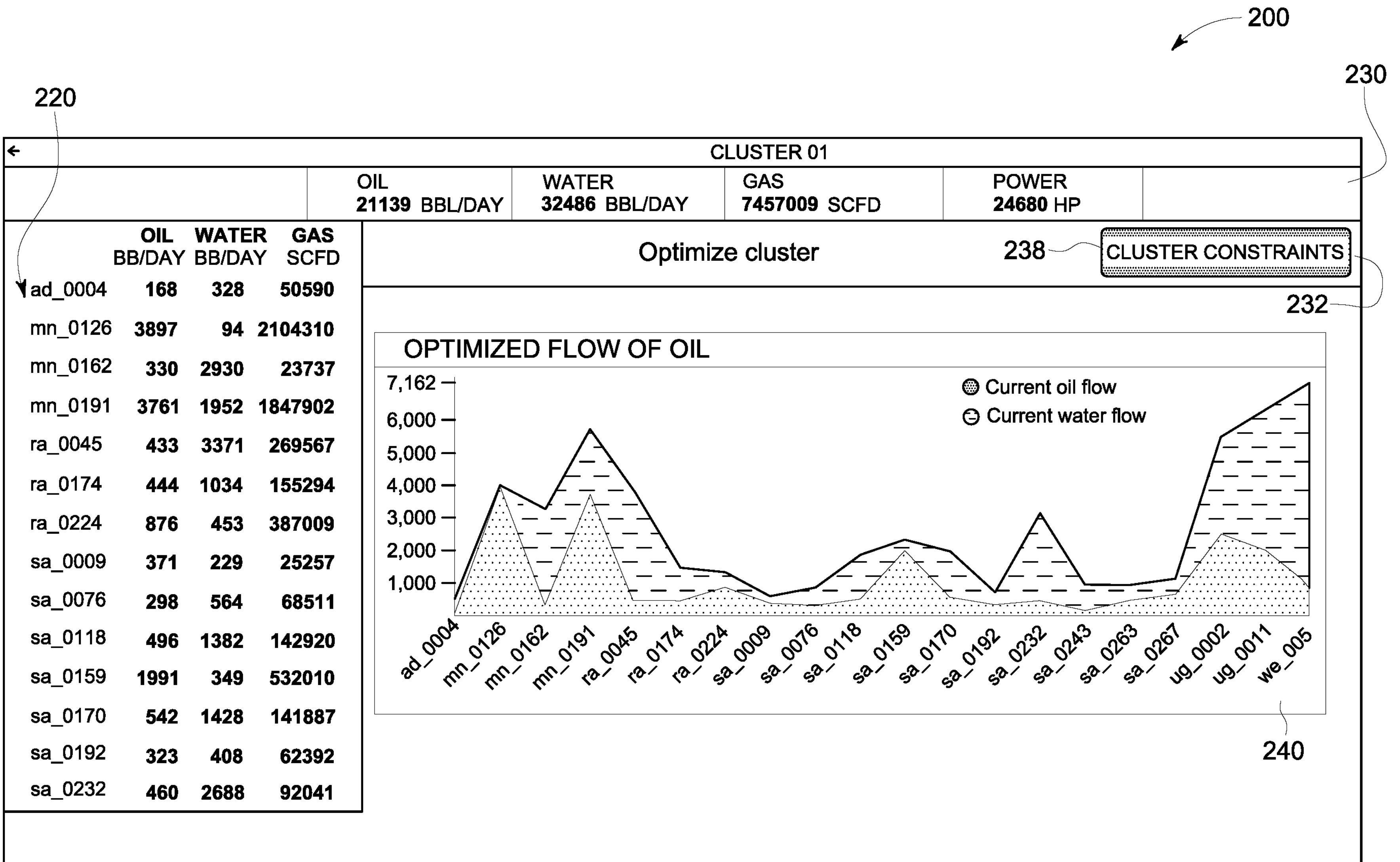
FIG. 6 is an illustration of the GUI display of FIG. 2 that displays plots for current oil flow and current water flow of an oil well.
Figure 7:
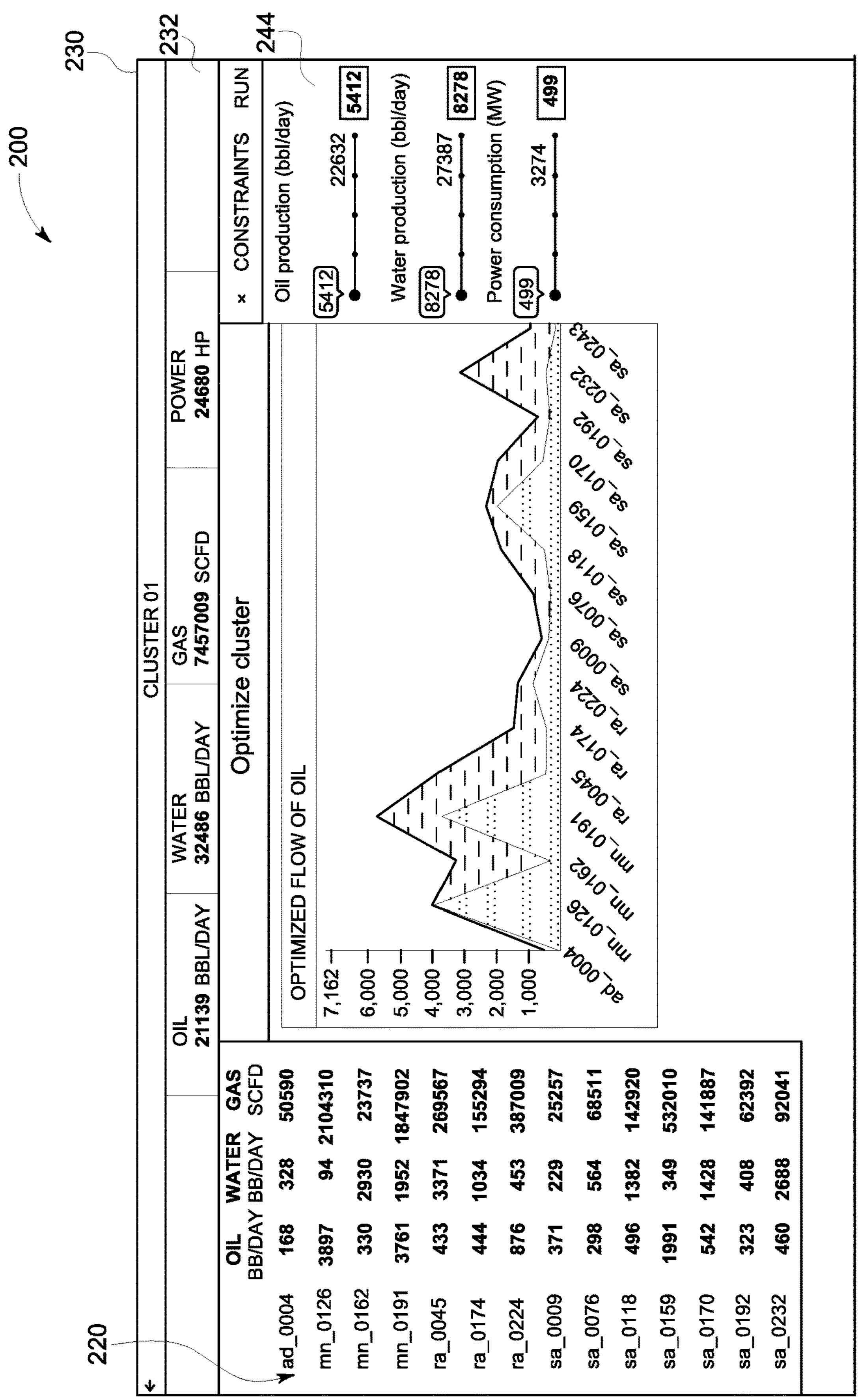
FIG. 7 is an illustration of the GUI display of FIG. 2 that displays a constraint dialog box.

FIG. 6 is an illustration of the GUI display 200 that displays an exemplary plot of the current oil flow and the current water flow of the oil wells in the oil well cluster (e.g., cluster 01) in the information panel 240. The input taskbar 232 can include a cluster constraint icon 238. As illustrated in FIG. 7, selecting the cluster constraint icon 238 can generate a constraint dialog box 244 through which a user can provide/select constraints on the oil well cluster (e.g. cluster 01). The oil well cluster constraints can include, for example, total oil production, total water production and total power consumption by the cluster. A user can select the values of the oil well cluster constraints (e.g., as described at step 104 of FIG. 1). Based on the user selection, one or more digital models (e.g., digital models of the DTV system) for the oil well cluster can be updated (e.g., as described at step 106 of FIG. 1).

Figure 8:
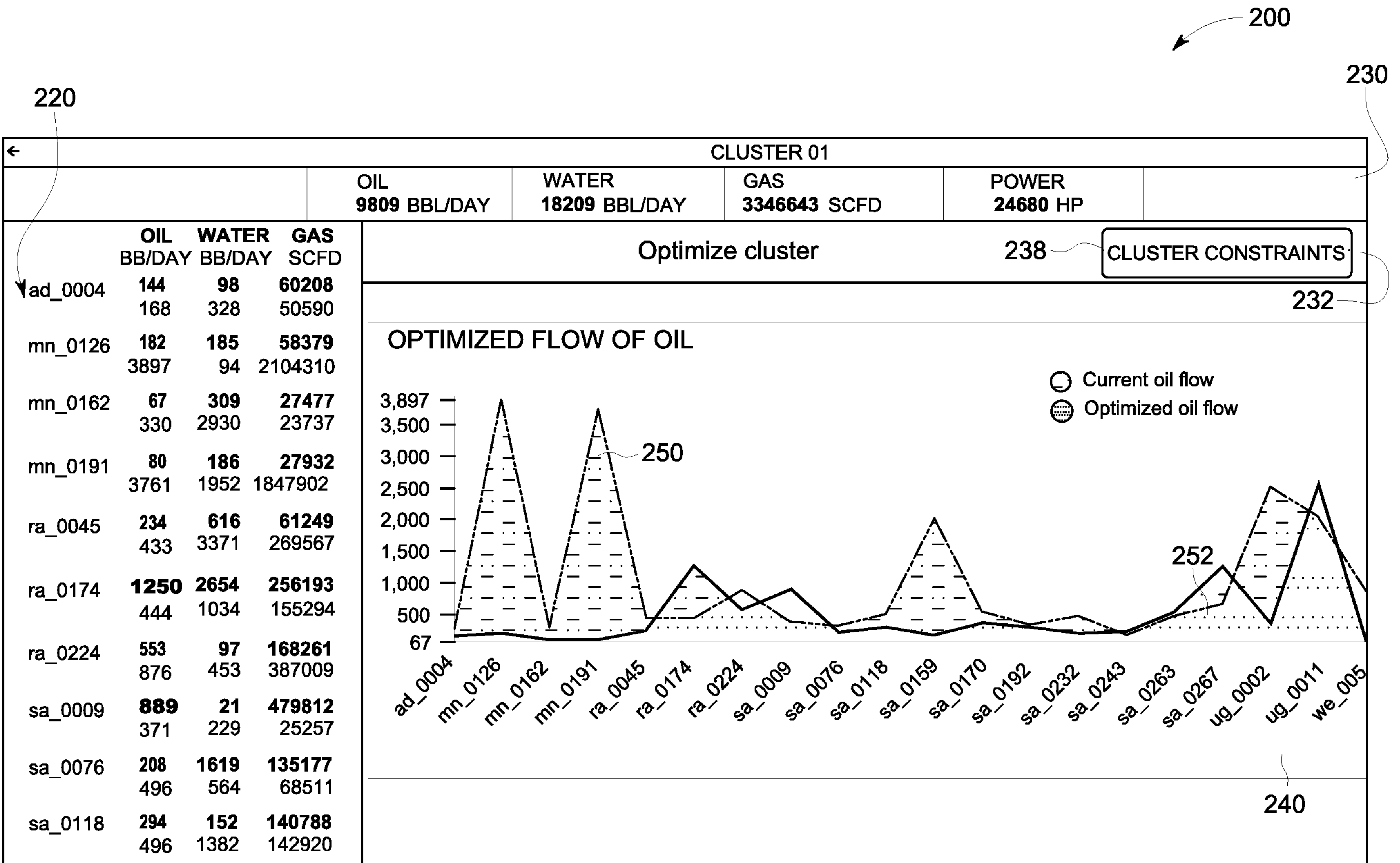
FIG. 8 is an illustration of the GUI display of FIG. 2 that displays the results of the simulation of one or more digital models based on the oil well cluster constraints provided by a user in the constraint dialog box of FIG. 7.

FIG. 8 is an illustration of the GUI 200 that can include the results of the simulation of one or more digital models based on the oil well cluster constraints provided by a user (e.g., as described at step 108 of FIG. 1). For example, the information panel 240 can include plots of the current oil production 250 and optimized oil production 252 (result of the simulation of the one or more digital models) of the various oil wells of the cluster (e.g., cluster 01). The vertical taskbar 220 can include the results of the optimization (e.g., oil production of the various oil wells in the cluster). Simulated changes in the oil production of the wells compared to the current oil production can also be visually presented. For example, if the optimized oil production of a well is greater than the current oil production, the optimized oil production value is displayed in a green color. Alternately/additionally, if the optimized oil production of a well is less than the current oil production, the optimized oil production value is displayed in a red color. In some implementations, the oil production value is displayed in red when the associated oil well is both un-optimized and requires calibration.

Figure 9:
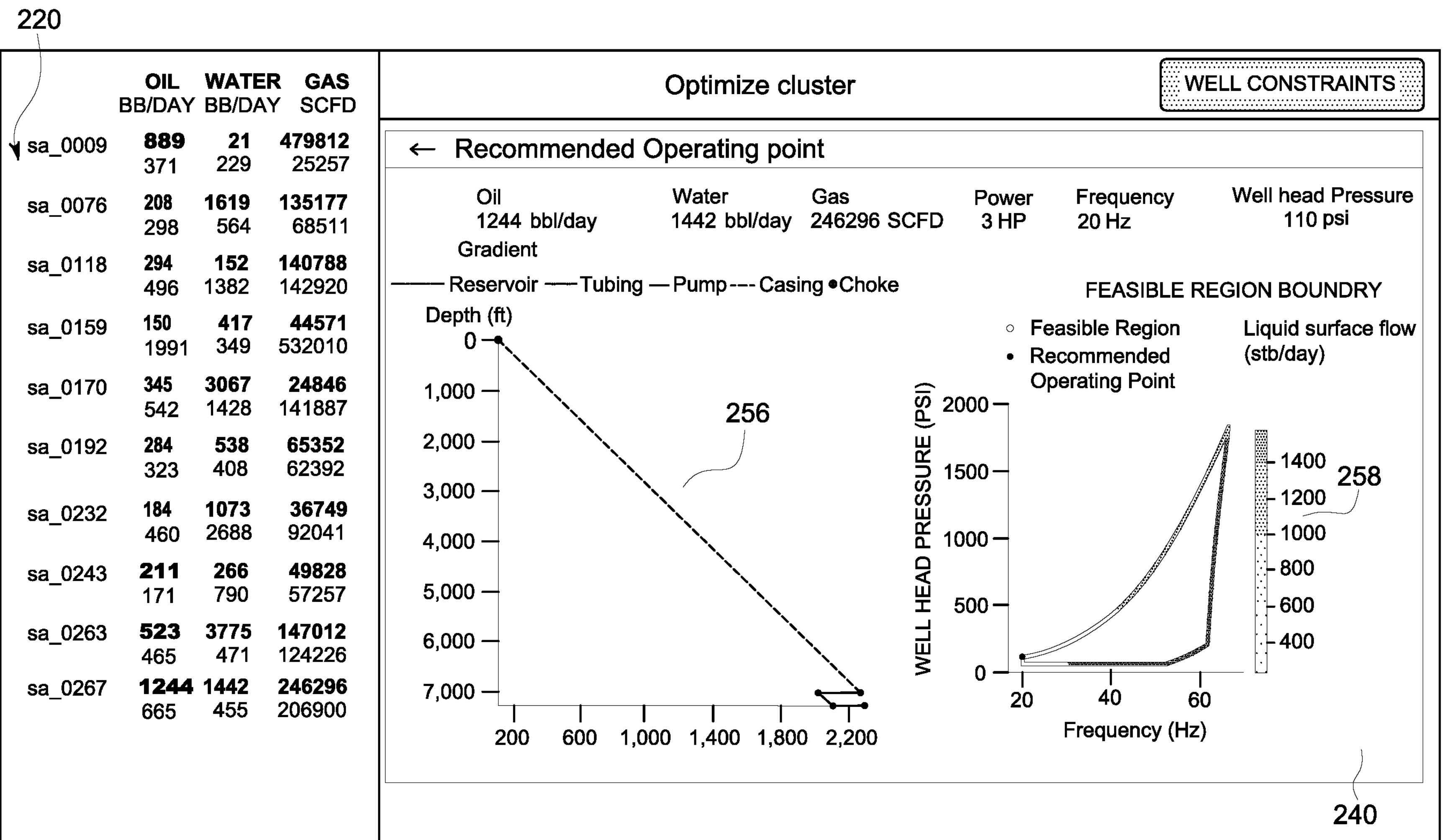
FIG. 9 is an illustration of the GUI display of FIG. 2 that displays the simulated operating parameters of an oil well of the oil well cluster.
Figure 10:
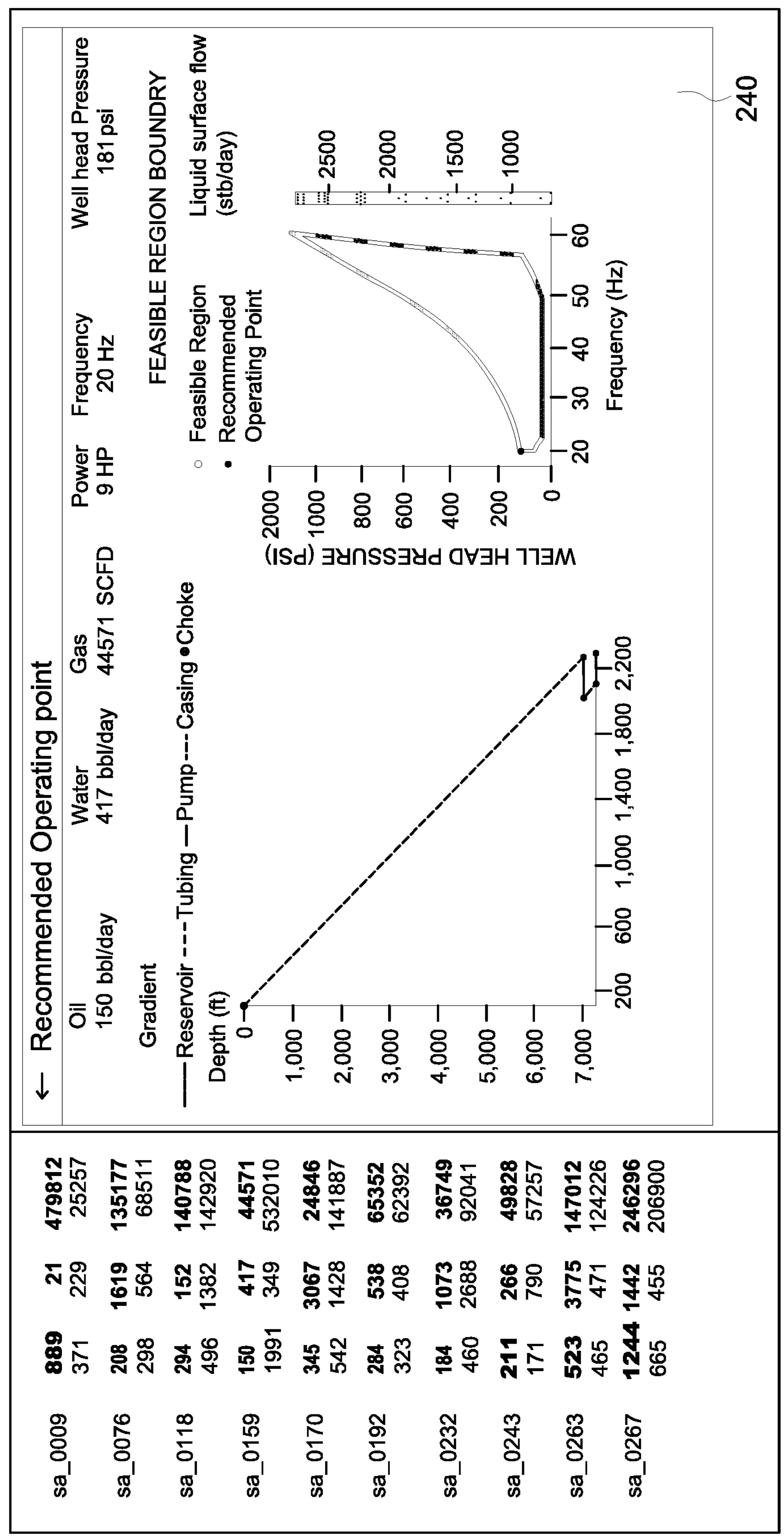
FIG. 10 is an illustration of the GUI display of FIG. 2 that displays the simulated operating parameters of a second oil well of the oil well cluster.

FIG. 9 is an illustration of the GUI 200 that provides the optimized operating parameters of an oil well of the oil well cluster (e.g., oil well "SA_0267"). A user can select the oil well whose optimized parameters can be displayed in the information panel 240 (e.g., by clicking on the name of the oil well in the vertical taskbar 220). The information panel 240 can include, for example, a plot 256 of the pressure gradient of the selected oil well. The information panel 240 can also include a plot 258 of the well head pressure versus frequency of an oil pump associated with the selected oil well (e.g., oil well "SA_0267"). The pressure gradient plot 256 shows the pressure versus depth plot and the plot on 258 shows the feasible boundary. FIG. 10 is an illustration of the GUI 200 that provides the simulated operating parameters of a second oil well of the oil well cluster (e.g., oil well "SA_0159").

Figure 11:
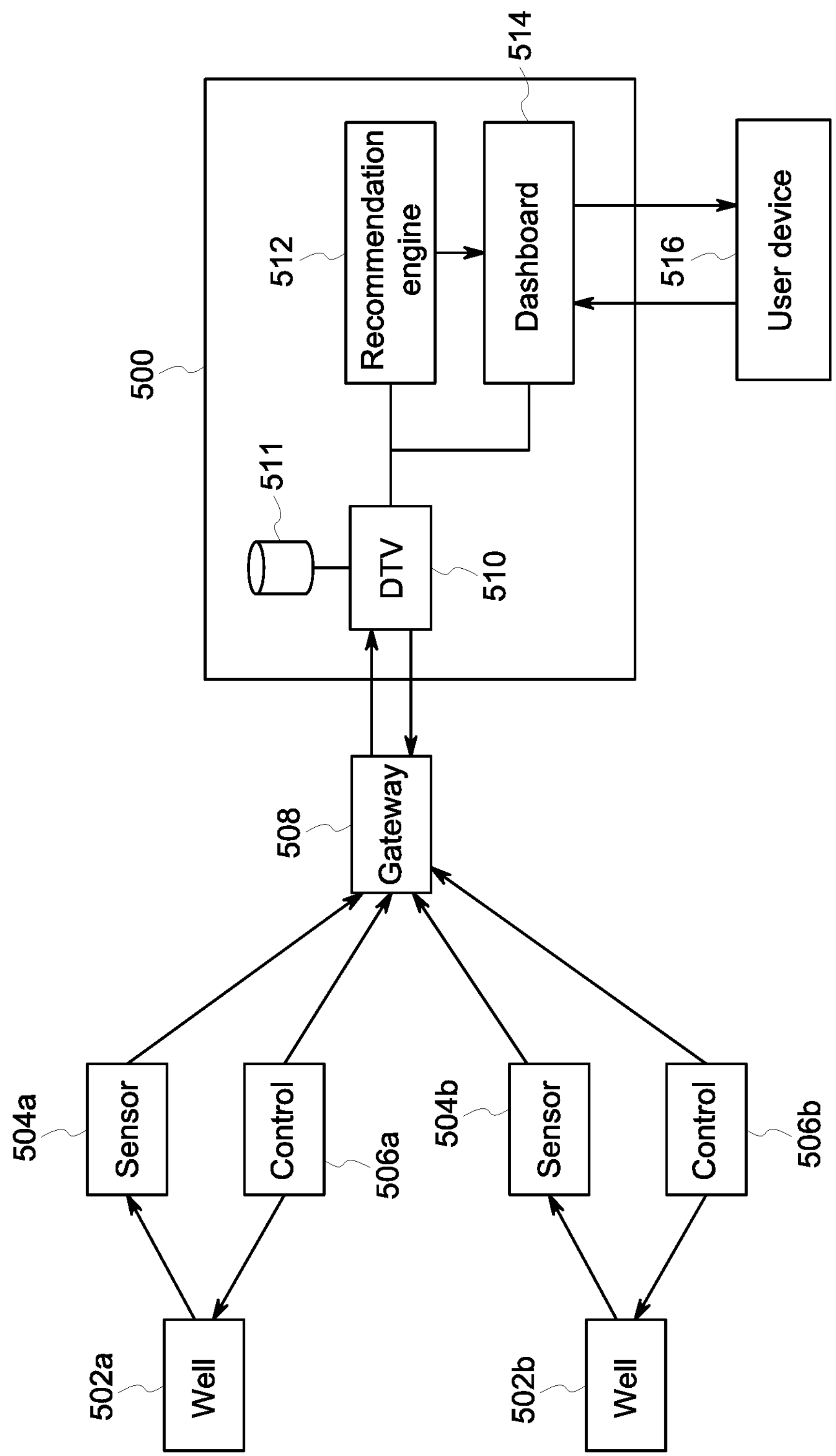
FIG. 11 illustrates and exemplary embodiment of a system block diagram of a monitoring system.

FIG. 11 illustrates and exemplary embodiment of a system block diagram of an asset monitoring system 500 that can monitor and/or operationally couple with an oil well cluster (e.g., oil well cluster 202). The monitoring system 500 can communicate with oil wells 502*a* and 502*b* of an oil well cluster (e.g., oil well cluster 202). The monitoring system 500 can operationally couple to an oil well 502*a* (or 502*b*), for example, via sensor 504*a* (or 504*b*) and control system 506*a* (or control 506*b*) associated with the oil well 502*a* (or 502*b*). The sensor 504*a* (or 504*b*) and control system 506*a* (or 506*b*) can communicate with the monitoring system 500 via a gateway 508 (e.g., a router, edge device, etc.). The monitoring system 500 can include a DTV system 510, a recommendation engine 512 and a dashboard 514. The recommendation engine 512 can include a rules engine that receives outputs from the digital models (e.g., executed in the DTV system 510) and generates a recommendation according to a rule set. The recommendation engine 512 can receive the digital model outputs and generate future predictive values using, for example, a predictive model.

Sensors 504*a* (or 504*b*) can include any type of sensor that can be incorporated into an industrial machine such as pressure sensor, vibration sensor, temperature sensor, humidity sensor, and the like. As an example, an oil well can include sensors measuring pump frequency, pressure, temperature, and the like. Control system 506*a* (or 506*b*) can include a controller operably coupled with the oil well. The control system 506*a* (or 506*b*) can alter the operational parameters of the oil pumps associated with oil wells 502*a* (or 502*b*), for example, by sending an instruction to modify operation of the oil pump (e.g., by changing the frequency of the pump). In some implementations, control system 506*a* (or 506*b*) can control operation of the sensors 504*a* (or 504*b*). For example, control system 506*a* (or 506*b*) can control the frequency that sensor measurements are acquired.

The DTV system 510 can receive operational parameters detected by the sensors 504*a* (or 504*b*), and transmit control signal to the control system 506*a* (or 506*b*). The DTV system 510 can calculate pump characteristics based on the received operational parameter and system coefficients which can be stored in a memory device 511. The DTV system 510 can also communicate with the recommendation engine 512 (e.g., provide pump characteristics) and the dashboard 514 (e.g., provide the dashboard 514 with operating parameters and pump characteristics, and receive from the dashboard 514 with new inputs provided by the user). The recommendation engine 512 can also communicate with the dashboard 514 (e.g., provide the dashboard 514 with recommendations). The dashboard 514 can communicate with a graphical user interface in a user device 516 (e.g., receive inputs from the GUI and provide recommendations, operating parameters and pump characteristics to the user device 516).

Figure 12:
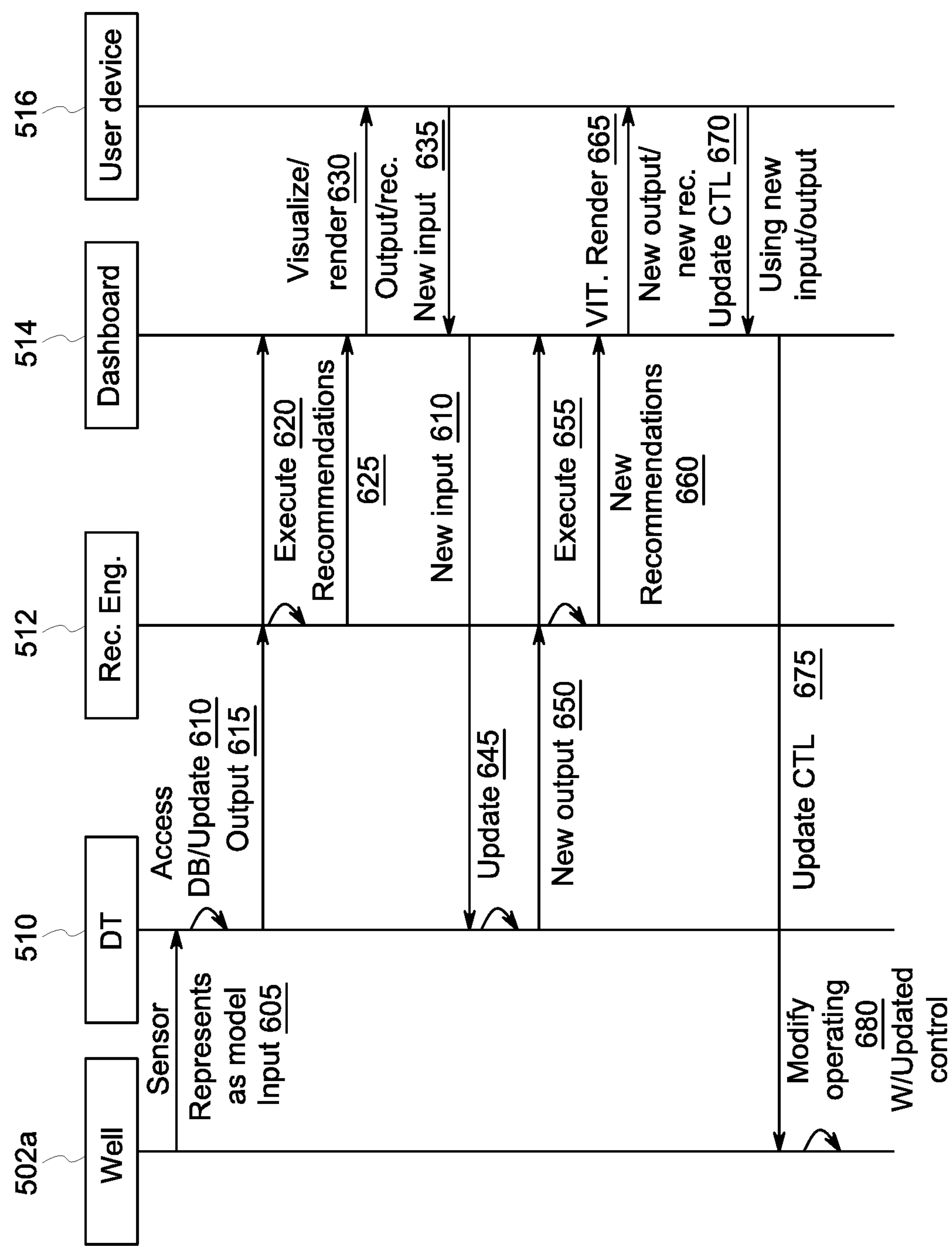
FIG. 12 illustrates an exemplary data flow diagram of the block diagram described in FIG. 11.

FIG. 12 illustrates an exemplary data flow diagram of the block diagram described in FIG. 11. At 605, the operational parameters of the oil well 502*a* detected by the sensor 504*a* is communicated to the DTV system 510. At 610, the DTV system 510 can calculate the pump characteristics based on one or more of the operational parameters. At 615, the pump characteristics are communicated to the recommendation engine 512 and the dashboard 514. At 620, the recommendation engine 512 can calculate the recommendation, for example, based on pump characteristics from the DTV system 510. At 625 the recommendations can be communicated to the dashboard 514 that can generate visual representation for the recommendation, operational parameters, pump characteristics and graphical objects to receive inputs from the user. The visual representation can be communicated to the user device at 630. At 635, the user device 516 can communicate the inputs received from the user to the dashboard 514, which can communicate the received input to the DTV system 510 (at 640). At 645, the DTV system 510 can update by recalculating the pump characteristics. At 650, the recalculated pump characteristics can be communicated to the recommendation engine 512 and the dashboard 514. At 655, the recommendation engine 512 can calculate a new recommendation (e.g., based on the recalculated pump characteristics). At 660 the new recommendation can be communicated to the dashboard 514. The dashboard 514 can generate visual representations for the new recommendation, new operational parameters, new pump characteristics, and a new graphical object to receive inputs from the user. The visual representations can be communicated to the user device at 665. At 670, the user device 516 can communicate the inputs received from the user to the dashboard 514 to the control system 506 (at 675). At 680, the control system can modify the operational parameters of the oil pump in the oil well 502.

Improvement (e.g., maximization) of oil production in oil fields can involve optimization of operation of artificial lifts such as electrical submersible pumps (ESP), progressive cavity pumps (PCP), rod lift systems (RLS), and the like. For oil wells with ESPs, the key operational optimization parameters can include frequency of the pump and the well head pressure (WHP). Production from a well can be maximized by increasing the frequency of pump (e.g., to a maximum value) subject to inherent constraints of the artificial lift equipment such as motor, pump, and the like. However, it may not be possible or desirable to independently optimize each individual well (e.g., due to constraints on power consumed by multiple wells in the oil field, total water production, and the like). It can be desirable, to optimize multiple oil wells in a cluster (e.g., all the wells in the cluster or oil field) based on properties of the oil wells, and/or global constraints (e.g., related to multiple oil wells, oil cluster, oil fields, and the like).

Some aspects of the current subject matter can provide a framework for optimizing/improving several wells and/or several clusters of wells (e.g., simultaneously) through a combination of physics based models and advanced optimization techniques. The current subject matter can provide many technical advantages. For example, this application can provide for an accelerated optimization methodology for improving (e.g., maximizing) oil production. The digital models and the associated optimization techniques can optimize multiple oil wells very quickly (e.g., in tens of seconds). Further the optimization can take into account multiple (e.g., all) inherent constraints of the individual wells as well as global constraints, which can be imposed by the production engineer. This framework can help production engineers to improve (e.g., maximize) production under constraints, and/or can allow them to perform what-if analyses on scenarios in real-time. This framework can allow production engineers to quickly react to developments such as failures in particular wells and/or change in available power by running the what-if scenarios and identifying other wells that can be optimized to meet production targets. The framework can be used for hypothetical scenarios so that outage and maintenance activities can be scheduled while minimizing production losses.

Oil/gas production can include a complex combination of several sub-processes that can be related to various units of the oil production system. For example, the oil production system can include crude distillation unit, control valves, pumps, reservoir, casing, pumps, tubing and the like. Liquefied Natural Gas ("LNG") production system can include wells, slug catcher unit, condensate column unit, condensate tank unit, CO2 separator unit, and the like. The overall oil/gas production can be improved by improving one or more of its sub-processes. A sub-process can be improved by providing a user with what-if scenarios for the sub-process in an automated manner. In the what-if scenario, operating parameters (e.g., state parameters, user configurable parameters, and the like) of the sub-process can be tweaked to identify the parameter values that can improve the overall efficiency of production.

Figure 13:
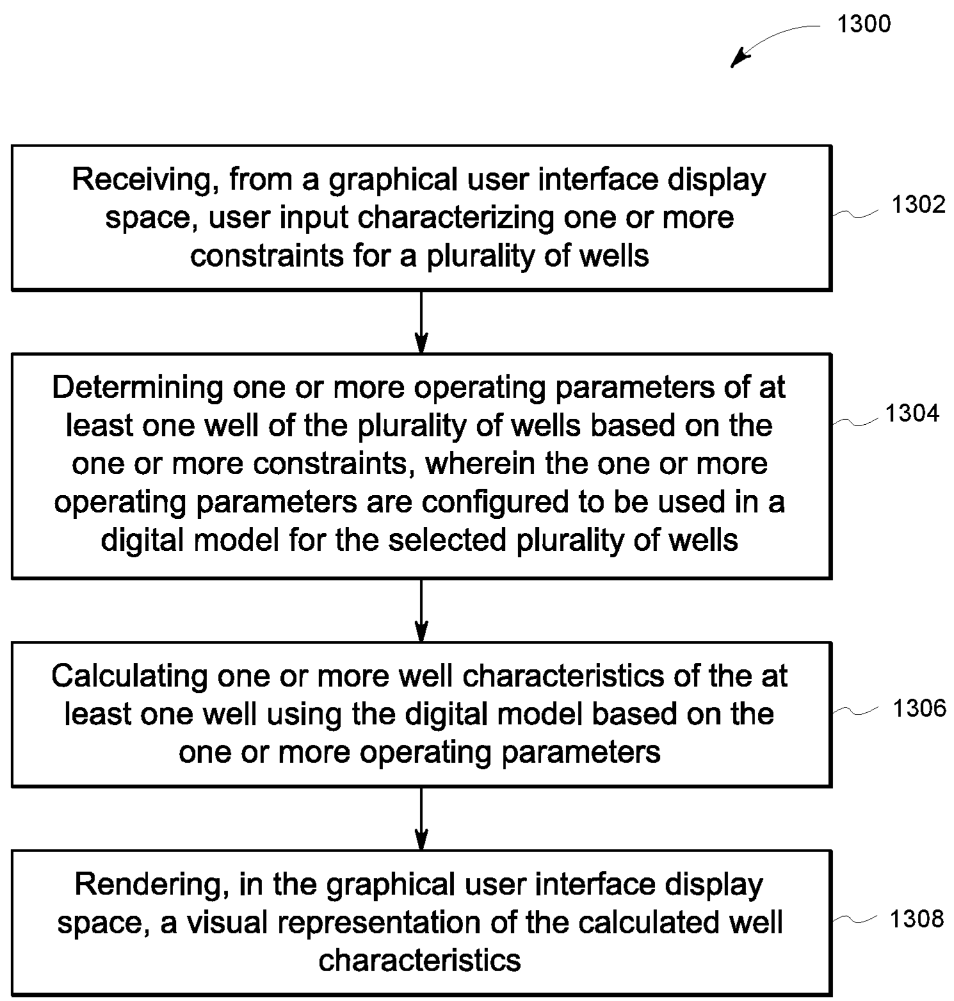
FIG. 13 is a flow chart of an exemplary method for monitoring and managing the operation of oil pumps associated with a selected group of oil wells in an oil well cluster.

FIG. 13 is a flow chart of an exemplary method for monitoring and managing the operation of oil pumps associated with a group of oil wells in an oil well cluster. At 1302, user input characterizing one or more constraints for a plurality of wells are received from a graphical user interface display space. In some implementations, the plurality of wells (or electrical submersible pumps in one or more wells) are selected based on the user input. In some implementations, the plurality of wells (e.g., gas lift wells) can be predetermined (e.g., predetermined as pads of gas lift wells).

Figure 14:
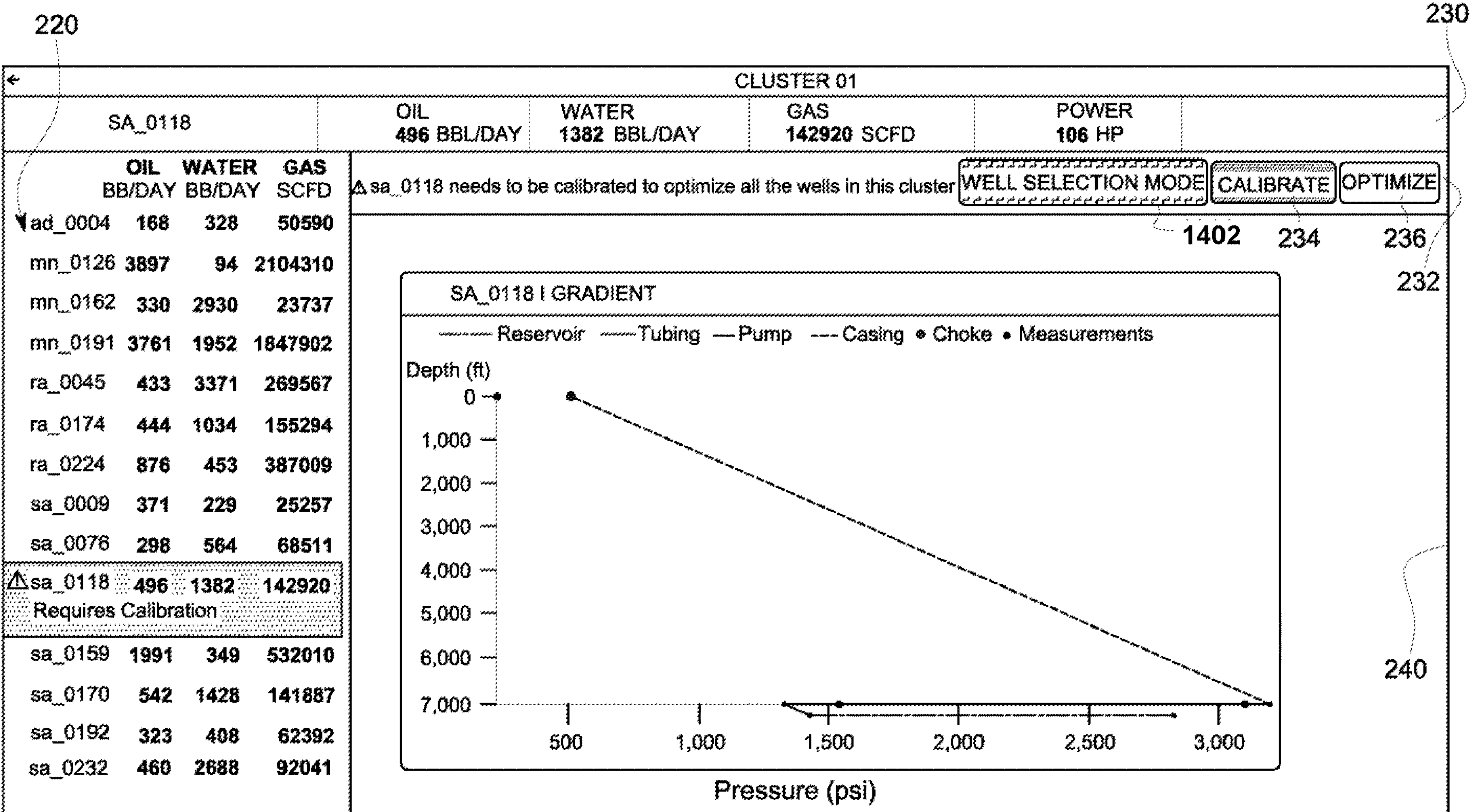
FIG. 14 illustrates an exemplary graphical user interface display 1400 for selecting and managing a group of oil wells.

FIG. 14 illustrates an exemplary graphical user interface display 1400 for selecting a group of oil wells (e.g., group that includes the plurality of wells). In some implementations, a user can select oil wells for the group by clicking on the Well Selection Mode icon 1402 followed by selection of one or more wells (e.g., by clicking, by double clicking, etc.) from the vertical taskbar 220. In some implementations, clicking on the well selection mode icon 1402 can display one or more predetermined groups of wells (e.g., pads of gas lift wells) from which the user can select.

The user can provide operational constraints for the operation of one or more wells (e.g., oil pumps in the wells) in the group and/or combined operational constraints associated the group of wells. For example, the user can set constraints on the intrinsic operating parameters (e.g., surface flowrate, bottomhole pressure, well head pressure, intake pressure, critical gas lift rate, gas production, and the like), and extrinsic operating parameters (oil production, water production, power consumption, pump frequency) of the pump of an oil well in the group of selected oil wells. The user can also provide constraints on operational parameter of the group of wells (e.g., group water production, group liquid production, group oil production, group power consumption, group gas production, group gas lift availability, and the like).

In some implementations, selection of the plurality of wells that constitute the group and the providing of the operational constraints of the group can be provided in distinct steps (e.g., by different users via different graphical user interfaces). In some implementations, a select group of authorized users can select the oil wells in the group. In some implementations, the selection can be performed from predetermined computing devices (e.g., devices located at a control station). Once the group of oil wells have been selected, a second authorized user can be notified of the selection. The second user can then provide the operational constraints of the group.

At 1304, one or more operating parameters of at least one well of the plurality of wells are determined based on the one or more constraints. This can be done, for example, by executing an optimization algorithm (e.g., by clicking on the optimize icon 236). The optimization algorithm can take operational constraints provided by the user as an input and generate revised operating parameters (e.g., revised intrinsic and/or extrinsic operating parameters of pumps associated with the oil wells in the group).

The revised operating parameters generated by the optimization algorithm (e.g., gas lift optimization algorithm) are configured to be used in a digital model of the plurality of wells. The digital model of the group of wells (e.g., which includes the plurality of wells) can be generated from the digital models of the individual wells in the group. For example, as illustrated in FIG. 11, the DTV system 510 can generate the digital model of a group of oil wells that includes oil wells 502*a* and 502*b* from the digital models of wells 502*a* and 502*b*. The DTV system 510 can also execute the optimization algorithm to generate revised operating parameters of the oil wells in the group (e.g., wells 502*a* and 502*b*) as described in step 1304.

At 1306, one or more well characteristics of the at least one well is calculated using the group digital model based on one or more of the revised operating parameters. The well characteristics can include pump characteristic values of one or more wells in the group (e.g., variable pump speed, pressure gradient, input performance relation (IPR), well head pressure, etc.). The well characteristics can also include current oil/well/gas production of the wells in the group. The well characteristics can also include estimation of the combined estimated oil/well/gas production and/or combined estimated power consumption of the group of wells based on the revised operating parameters determined at step 1304.

At 1308, a visual representation of the calculated well characteristics is rendered in the graphical user interface display space (e.g., GUI display 1400). The visual representation can include a plot of the pump characteristics (e.g., variable pump speed, pressure gradient, input performance relation (IPR), well head pressure, etc.). For example, as illustrated in FIG. 9, pressure gradient and well head pressure can be visually represented (e.g. in plots 256 and 258, respectively) in the graphical user interface 1400. The visual representation can also include a plots of oil/gas/water production by wells in the group (e.g., as illustrated in FIG. 8).

The user can implement the revised operating parameters, for example, by clicking on the calibrate icon 234. This can change the current operating parameters (e.g., intrinsic operating parameters, extrinsic operating parameters, etc.) of one or more pumps in the group of oil wells to the revised operating parameters.

Improvement (e.g., maximization) of oil production in oil fields can involve optimization of operation of artificial lifts such as electrical submersible pumps (ESP), progressive cavity pumps (PCP), rod lift systems (RLS), and the like. For oil wells with ESPs, the key operational optimization parameters can include frequency of the pump and the well head pressure (WHP). Production from a well can be maximized by increasing the frequency of pump (e.g., to a maximum value) subject to inherent constraints of the artificial lift equipment such as motor, pump, and the like. However, it may not be possible or desirable to independently optimize each individual well (e.g., due to constraints on power consumed by multiple wells in the oil field, total water production, and the like). It can be desirable, to optimize multiple oil wells in a cluster (e.g., all the wells in the cluster or oil field) based on properties of the oil wells, and/or global constraints (e.g., related to multiple oil wells, oil cluster, oil fields, and the like).

In some instances, improving the oil production of the oil field can simultaneously optimize multiple wells while ensuring that no local or global constraints are violated. Further, this methodology can accomplish the optimization of several wells in a very short period of time (e.g., in tens of seconds) that can allow the user to quickly take remedial action.

Some aspects of the current subject matter can provide a framework for optimizing/improving several wells and/or several clusters of wells (e.g., simultaneously) through a combination of physics based models and advanced optimization techniques. The current subject matter can provide many technical advantages. For example, this application can provide for an accelerated optimization methodology for improving (e.g., maximizing) oil production. The digital models and the associated optimization techniques can optimize multiple oil wells very quickly (e.g., in tens of seconds). Further the optimization can take into account multiple (e.g., all) inherent constraints of the individual wells as well as global constraints, which can be imposed by the production engineer. This framework can help production engineers to improve (e.g., maximize) production under constraints, and/or can allow them to perform what-if analyses on scenarios in real-time. This framework can allow production engineers to quickly react to developments such as failures in particular wells and/or change in available power by running the what-if scenarios and identifying other wells that can be optimized to meet production targets. The framework can be used for hypothetical scenarios so that outage and maintenance activities can be scheduled while minimizing production losses Well constraints can include for example, an upper and a lower limit for oil generated by the well; an upper and a lower limit for water generated by/flowing from the well; an upper and a lower limit for well head pressure of the well; and an upper and a lower limit for the well pump frequency. Cluster constraints can include for example, an upper and a lower limit for oil generated by the cluster; an upper and a lower limit for water generated by/flowing from the cluster; an upper and a lower limit for power consumed by the cluster (e.g., by pumps in the cluster). Field constraints can include for example, an upper and a lower limit for oil generated by the field; an upper and a lower limit for water generated by/flowing from the field; an upper and a lower limit for power consumed by the cluster (e.g., by pumps in the field).

Some implementations of the current subject matter can provide many technical advantages. For example, optimization algorithms that independently optimize wells may not be suitable for optimizing well clusters (e.g., simultaneously). As a result, these optimization algorithms can limit the level of exploration. Further, in some implementations, the current subject matter can address and can improve (e.g., optimize) multiple constraints, which may not be possible using other approaches or can be very time consuming. Further, other approaches may require experts to optimize wells iteratively by trial and error and are generally slow and may not even result in a feasible solution. In some implementations, the current subject matter can have faster reaction time to contingencies in the field, and can the optimizations can be global in nature (e.g., over multiple oil wells).

Some implementations of the current subject matter can allow for optimal utilization of available resources in an oil field (like power) for improving (e.g., maximizing) oil production while minimizing the amount of water produced. This can lead to a reduction in down-time and production losses as users can run what-if analyses with specific production targets and constraints on individual wells. Some implementations the current subject matter can allow for efficient operation of artificial lift equipment.

Other embodiments are within the scope and spirit of the disclosed subject matter. For example, the monitoring system described in this application can be used in facilities that have complex machines with multiple operational parameters that need to be altered to change the performance of the machines (e.g., power generating turbines). Usage of the word "optimize"/"optimizing" in this application can imply "improve"/"improving."

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a Read-Only Memory or a Random Access Memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web interface through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A method comprising:

rendering, in a graphical user interface display space, an interactive graphical object characterizing a first input value of a first digital model of a plurality of oil and gas industrial machines;

receiving data characterizing user interaction with the interactive graphical object, the data characterizing the user interaction indicative of the first input value of the first digital model;

updating the first digital model to generate updated output values representative of an operational parameter of the plurality of oil and gas industrial machines;

rendering, in the graphical user interface display space, a visual representation of the updated output values;

determining an uncalibrated oil and gas industrial machine of the plurality of oil and gas industrial machines based on comparison between detected operating parameters of the uncalibrated oil and gas industrial machine and operating parameters of the oil and gas industrial machines calculated by the first model; and rendering, in the graphical user interface display space, a third interactive graphical object indicative of the uncalibrated oil and gas industrial machine.

2. The method of claim 1, wherein updating the first digital model of the plurality of oil and gas industrial machines includes determining one or more system coefficients associated with the plurality of oil and gas industrial machines.

3. The method of claim 2, wherein the first digital model is configured to calculate the one or more system coefficients based on a characteristic mathematical representation of the plurality of oil and gas industrial machines, the characteristic mathematical representation includes a system of equations that calculate the one or more system coefficients based, at least in part, on the data characterizing the user interaction indicative of the first input value.

4. The method of claim 3, wherein updating the first digital model includes updating at least one variable in the system of equations based on the first input value and evaluating the updated first model to generate the updated output values.

5. The method of claim 1 further comprising:

receiving user input characterizing selection of a second oil and gas industrial machine of the plurality of oil and gas industrial machines; and rendering, in the graphical user interface display space, a visual representation of calculated values of second operational characteristic of the second oil and gas industrial machine.

6. The method of claim 1, further comprising:

rendering, in the graphical user interface display space, a second interactive graphical object characterizing a second input value indicative of selection of one or more oil and gas industrial machines from the plurality of oil and gas industrial machines;

receiving data characterizing user interaction with the second interactive graphical object indicative of the second input value;

generating the first digital model based on the second input value.

7. The method of claim 1, further comprising:

receiving detected input values representative of the operational parameter of the plurality of oil and gas industrial machines; and rendering, in the graphical display space, a visual representation of the input values adjacent to the visual representation of the updated output values.

8. The method of claim 7, wherein the detected input values of the operational parameter are detected by one or more sensors coupled to the plurality of oil and gas industrial machines.

9. The method of claim 1, wherein the plurality of oil and gas industrial machine includes one or more of a crude distillation unit, control valves, a reservoir, a casing unit, pumps and tubing unit.

10. The method in claim 1, further comprising communicating data characterizing one or more of the first digital model, the first input value and the updated output values to a global monitoring system configured to monitor the plurality of oil and gas industrial machines.

11. The method of claim 1, further comprising:

transmitting, to a controller of an oil and gas industrial machine of the plurality of oil and gas industrial machines, an instruction to modify operation of the oil and gas industrial machine.

12. The method of claim 1, wherein the plurality of oil and gas industrial machines are in communication with a machine monitoring platform including the first digital model.

13. A system comprising:

at least one data processor;

memory coupled to the at least one data processor, the memory storing instructions to cause the at least one data processor to perform operations comprising:

rendering, in a graphical user interface display space, an interactive graphical object characterizing a first input value of a first digital model of a plurality of oil and gas industrial machines;

receiving data characterizing user interaction with the interactive graphical object, the data characterizing the user interaction indicative of the first input value of the first digital model;

updating the first digital model to generate updated output values representative of an operational parameter of the plurality of oil and gas industrial machines;

rendering, in the graphical user interface display space, a visual representation of the updated output values;

determining an uncalibrated oil and gas industrial machine of the plurality of oil and gas industrial machines based on comparison between detected operating parameters of the uncalibrated oil and gas industrial machine and operating parameters of the oil and gas industrial machines calculated by the first model; and rendering, in the graphical user interface display space, a third interactive graphical object indicative of the uncalibrated oil and gas industrial machine.

14. The system of claim 13, wherein updating the first digital model of the plurality of oil and gas industrial machines includes determining one or more system coefficients associated with the plurality of oil and gas industrial machines.

15. The system of claim 14, wherein the first digital model is configured to calculate the one or more system coefficients based on a characteristic mathematical representation of the plurality of oil and gas industrial machines, the characteristic mathematical representation includes a system of equations that calculate the one or more system coefficients based, at least in part, on the data characterizing the user interaction indicative of the first input value.

16. The system of claim 15, wherein updating the first digital model includes updating at least one variable in the system of equations based on the first input value and evaluating the updated first model to generate the updated output values.

17. The system of claim 14, wherein the plurality of oil and gas industrial machine includes one or more of a crude distillation unit, control valves, a reservoir, a casing unit, pumps and tubing unit.

18. A monitoring system comprising:

a dashboard including a graphical user interface display space;

a digital twin validation system including a processor configured to perform operations comprising:

rendering, in a graphical user interface display space, an interactive graphical object characterizing a first input value of a first digital model of a plurality of oil and gas industrial machines;

receiving data characterizing user interaction with the interactive graphical object, the data characterizing the user interaction indicative of the first input value of the first digital model;

updating the first digital model to generate updated output values representative of an operational parameter of the plurality of oil and gas industrial machines;

rendering, in the graphical user interface display space, a visual representation of the updated output values;

determining an uncalibrated oil and gas industrial machine of the plurality of oil and gas industrial machines based on comparison between detected operating parameters of the uncalibrated oil and gas industrial machine and operating parameters of the oil and gas industrial machines calculated by the first model; and rendering, in the graphical user interface display space, a third interactive graphical object indicative of the uncalibrated oil and gas industrial machine.

* * * * *